United States Patent
Li et al.

(10) Patent No.: US 9,123,167 B2
(45) Date of Patent: Sep. 1, 2015

(54) SHADER SERIALIZATION AND INSTANCE UNROLLING

(71) Applicants: Yunjiu Li, Santa Clara, CA (US); Michael Green, Santa Clara, CA (US)

(72) Inventors: Yunjiu Li, Santa Clara, CA (US); Michael Green, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 13/631,866

(22) Filed: Sep. 29, 2012

(65) Prior Publication Data

US 2014/0092092 A1   Apr. 3, 2014

(51) Int. Cl.
G06T 15/50 (2011.01)
G06T 17/20 (2006.01)
G06F 9/44 (2006.01)

(52) U.S. Cl.
CPC . G06T 17/20 (2013.01); G06F 9/44 (2013.01); G06T 15/50 (2013.01); G06T 2200/28 (2013.01); G06T 2210/52 (2013.01)

(58) Field of Classification Search
None
See application file for complete search history.

(56) References Cited

U.S. PATENT DOCUMENTS

| | | | |
|---|---|---|---|
| 7,584,342 B1 | 9/2009 | Nordquist et al. | |
| 7,634,637 B1 | 12/2009 | Lindholm et al. | |
| 8,225,325 B2 | 7/2012 | Munshi et al. | |
| 2004/0226011 A1 | 11/2004 | Augsburg et al. | |
| 2007/0091089 A1 | 4/2007 | Jiao et al. | |
| 2008/0184211 A1 | 7/2008 | Nickolls et al. | |
| 2010/0118028 A1 | 5/2010 | Pallister | |
| 2010/0123717 A1 | 5/2010 | Jiao | |
| 2010/0146162 A1 | 6/2010 | Wagh et al. | |
| 2010/0214294 A1 | 8/2010 | Li et al. | |
| 2011/0227920 A1* | 9/2011 | Adams et al. | 345/426 |
| 2014/0019723 A1 | 1/2014 | Yamada et al. | |

OTHER PUBLICATIONS

Ricardo Marroquim et al., "Introduction to GPU Programming with GLSL," 2009, 14 pages.
"Intel® OpenSource HD Graphics, Programmer's Reference Manual (PRM), vol. 1 Part 1: Graphics Core (SandyBridge)," May 2011, Revision 1.0, 130 pages, Intel Corporation.
"Intel® OpenSource HD Graphics, Programmer's Reference Manual (PRM), vol. 1 Part 3: Graphics Core—Memory Interface and Commands for the Render Engine (SandyBridge)," May 2011, Revision 1.0, 132 pages, Intel Corporation.
"Intel® OpenSource HD Graphics, Programmer's Reference Manual (PRM), vol. 4 Part 1: Subsystem and Cores—Shared Functions (SandyBridge)," May 2011, Revision 1.0, 282 pages, Intel Corporation.

(Continued)

*Primary Examiner* — Edward Martello
(74) *Attorney, Agent, or Firm* — Blakely, Sokoloff, Taylor & Zafman LLP

(57) ABSTRACT

A graphics engine with shader unit thread serializing and instance unrolling functionality that executes multi-threaded shader logic in a single hardware thread is described. Hardware accelerated tessellation functionality is implemented utilizing programmable pipeline stages that allow custom, runtime configuration of graphics hardware utilizing programs compiled from a high level shader language that are executed using one or more shader execution cores. In one embodiment, multiple shader unit program threads are serialized to run in one hardware thread to allow a greater number of instructions to be executed on the shader cores and preserve hardware threads for primitive processing by other shader units.

20 Claims, 9 Drawing Sheets

(56) References Cited

OTHER PUBLICATIONS

Natalya Tatarchuk, "Future-Proof Games with Real-Time Tessellation," Game Developer's Conference, Feb. 18-22, 2008, www.gdconf.com, 54 pages.

Ricardo Marroquim et al., "Introduction to GPU Programming With GLSL", 2009, 14 Pages.

"Intel® Opensource HD Graphics, Programmer's Reference Manual (PRM), vol. 1 Part 1: Graphics Core (SandyBridge)", May 2011, Revision 1.0, 130 Pages, Intel Corporation.

"Intel® Opensource HD Graphics, Programmer's Reference Manual (PRM), vol. 1 Part 3: Graphics Core-Memory Interface and Commands for the Render Engine (SandyBridge)", May 2011, Revision 1.0, 132 Pages, Intel Corporation.

"Intel® Opensource HD Graphics, Programmer's Reference Manual (PRM), vol. 4 Part 1: Subsystem and Cores-Shared Functions (SandyBridge)", May 2011, Revision 1.0, 282 Pages, Intel Corporation.

Natalya Tatarchuk, "Future-Proof Games With Real-Time Tessellation", Game Developer's Conference, Feb. 18-22, 2008, www.gdconf.com, 54 pages.

\* cited by examiner

SHADER SERIALIZATION AND INSTANCE UNROLLING

FIELD

The described embodiments are generally related to the field of computer graphics. More particularly, embodiments relate to the load balancing and merging of computer graphics shader core workloads.

BACKGROUND

Three Dimensional (3D) models with low geometric detail may not fully convey the desired complexity of a 3D object. Higher detailed objects with a larger number of smaller polygons and an increased number of vertices may be better suited for use in some scenarios. However, using a finely detailed object defined by a larger number of vertices requires a larger amount of system resources than a coarsely detailed object. Accordingly, as the number of polygons and vertices increases in accordance with higher geometric detail, the 3D graphics engine will approach the limit of available processing capability and system bandwidth.

Graphics engines featuring support for hardware accelerated tessellation provide one solution by allowing the creation of geometrically complex 3D objects for use in the final 3D scene while storing and animating less complex objects using a relatively low number of polygons. Coarse geometric models are stored and animated, then the polygons of the geometric model are increased in detail by subdividing the polygons into smaller, more finely detail polygons during the rendering of the final 3D object, allowing an adaptable level of geometric detail. Hardware accelerated tessellation can be accomplished utilizing small programs known as "shaders" that execute on the graphics engine. Graphics applications generally supply shader programs in a high level language, along with polygons, textures, and other object data, as defined by one or more published Application Programming Interface (API). Such high level shaders are not hardware specific, so manufacturers of graphics hardware provide functionality to convert high level shader input into low level commands tailored for specific hardware. In some instances those commands are run in parallel on the graphics hardware when multi-threaded shader execution is supported.

Modern graphics engines utilize multiple parallel processors referred to as "shader cores" to execute multiple simultaneous threads of shader instructions. As high level shader programs are converted into low level commands, hardware specific optimizations are often included into the programs to better utilize the features of specific graphics hardware. Some graphics engines are designed explicitly to perform a large number of parallel operations using a larger number of shader cores, each executing a small number of instructions, while other graphics engines feature a smaller number of relatively more powerful shader cores capable of performing a larger number of instructions per core.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 7B is an illustration of data flow in one embodiment of graphics engine facilitated data pass-through.

DETAILED DESCRIPTION

Described herein are embodiments of a graphics engine with shader unit thread serializing and instance unrolling functionality that executes multi-threaded shader logic in a single hardware thread, allowing a greater number of instructions to execute on the shader cores while limiting the number of shader unit threads that must be managed and scheduled. Embodiments of the invention implement hardware accelerated tessellation functionality utilizing programmable pipeline stages that allow custom, runtime configuration of graphics hardware utilizing programs compiled from a high level shader language that are executed using one or more shader execution cores. In one embodiment, multiple shader unit program threads are serialized to run in a single hardware thread to allow a greater number of instructions to be executed on the shader cores and preserve hardware threads for use by other shader units.

Figure 1:
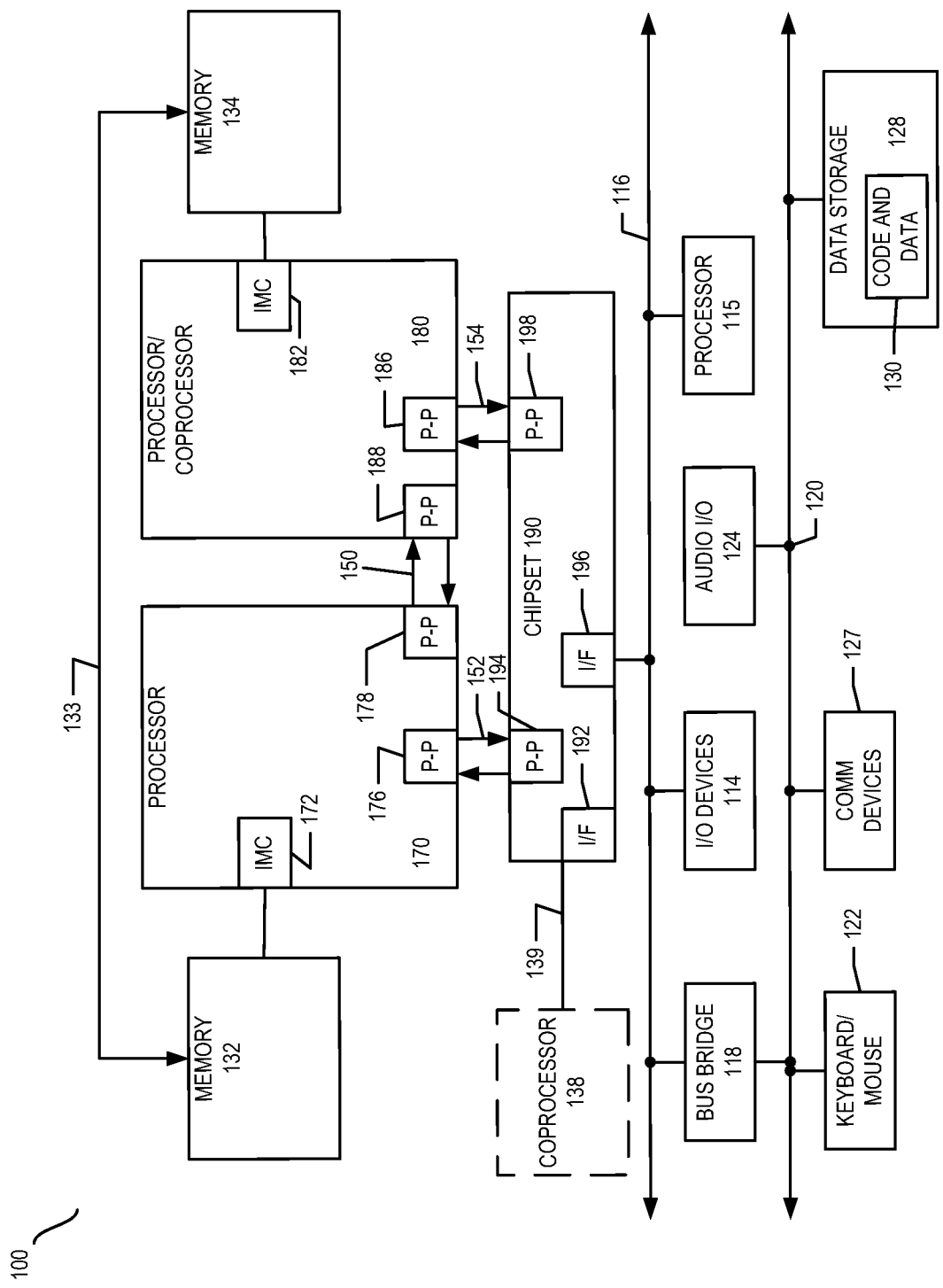
FIG. 1 is a block diagram of one embodiment of a system to perform load balancing and merging of shader execution thread workloads.

FIG. 1 illustrates a block diagram of an example system 100 in accordance with an embodiment of the present invention. As shown in FIG. 1, multiprocessor system 100 is a point-to-point interconnect system, and includes a first processor 170 and a second processor 180 coupled via a point-to-point interconnect 150. Processors 170 and 180 are shown including integrated memory controller (IMC) units 172 and 182, respectively. Processor 170 also includes as part of its bus controller units point-to-point (P-P) interfaces 176 and 178; similarly, second processor 180 includes P-P interfaces 186 and 188. Processors 170, 180 exchange information via a point-to-point (P-P) interface 150 using P-P interface circuits 178, 188. As shown in FIG. 1, IMCs 172 and 182 couple the processors respectively to a memory 132 and a memory 134, which are attached to the respective processors and coupled with the main system memory via a memory bus 133.

Processors 170, 180 exchange information with a chipset 190 via individual P-P interfaces 152, 154 using point to point interface circuits 176, 194, 186, 198. Chipset 190 can optionally exchange information with the coprocessor 138 via a high-performance interface 139. In one embodiment, the coprocessor 138 is a special-purpose processor, such as high-throughput Many Integrated Core (MIC) processor, a graphics engine, or the like. A shared cache (not shown) is included in both processors and optionally, outside of both processors and connected with the processors via P-P interconnect, such that either or both processors' local cache information is stored in the shared cache if a processor is placed into a low power mode.

Chipset 190 is coupled to a first bus 116 via an interface 196. In one embodiment, first bus 116 is a Peripheral Component Interconnect (PCI) bus, or a bus such as a PCI Express bus or another third generation I/O interconnect bus, although the scope of the present invention is not so limited. As shown in FIG. 1, various I/O devices 114 are coupled to first bus 116, along with a bus bridge 118 which couples first bus 116 to a low pin count bus 120. In one embodiment, one or more additional processor(s) 115 (e.g. MIC processors, graphics engines, Digital Signal Processors) are coupled to first bus 116. Various devices couple to the low pin count bus 120 including a keyboard and/or mouse 122, communication devices 127 and a storage unit 128 such as a disk drive or other mass storage device which includes instructions/code or data 130. Further, an audio I/O 124 can couple to the second bus 120. Note that other architectures are possible. For example, instead of the point-to-point architecture of FIG. 1, a system can implement a multi-drop bus or other such architecture.

Figure 2:
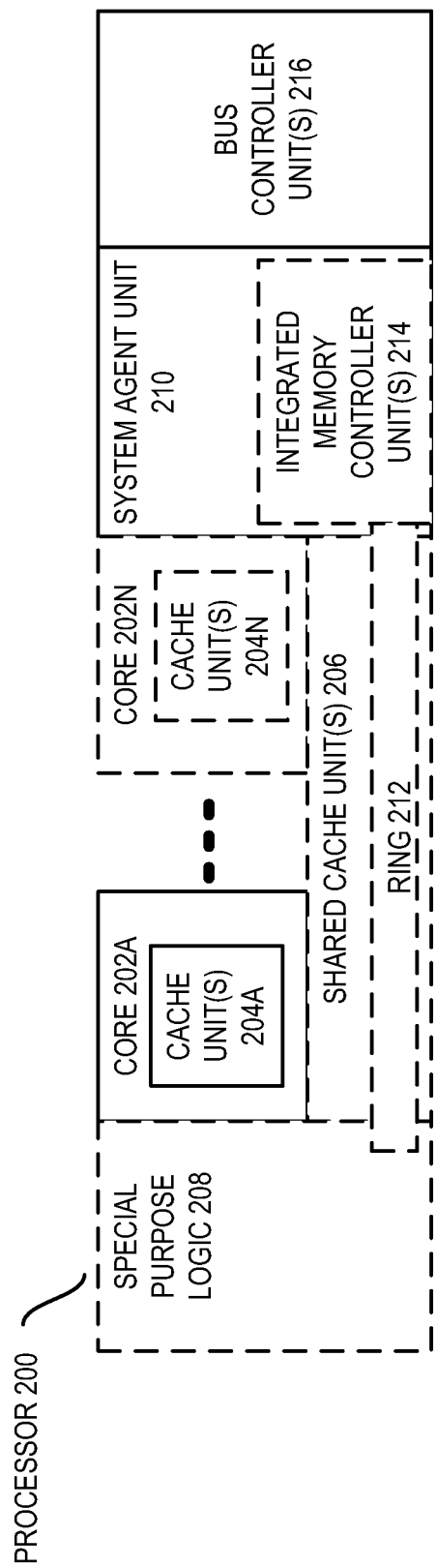
FIG. 2 is a block diagram of one embodiment of a processor with an integrated graphics unit.

Each of the processors 170 and 180 are some version of the processor 200 of FIG. 2, which shows a block diagram of a processor 200 that has one or more cores and an optional integrated memory controller and integrated graphics. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-202N, a set of one or more integrated memory controller unit(s) 214 in the system agent unit 210, and special purpose logic 208.

Different implementations of the processor 200 include: 1) a CPU with the special purpose logic 208 being integrated graphics and/or scientific (throughput) logic (which includes one or more cores), and the cores 202A-202N being one or more general purpose cores (e.g., general purpose in-order cores, general purpose out-of-order cores, a combination of the two); 2) a coprocessor with the cores 202A-202N being a large number of special purpose cores for graphics and/or scientific calculations; and 3) a coprocessor with the cores 202A-202N being a large number of general purpose in-order cores. Thus, the processor 200 is either a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor can also be implemented across several chips, or entirely on one chip.

The memory hierarchy includes one or more levels of cache within the cores, a set of one or more shared cache units 206, and external memory (not shown) coupled to the set of integrated memory controller units 214. The set of shared cache units 206 includes one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments use any number of well-known techniques for interconnecting such units. In one embodiment, coherency is maintained between one or more cache units 206 and cores 202A-202N.

The system agent 210 includes those components coordinating and operating cores 202A-202N. The system agent unit 210 includes, for example, a power control unit (PCU) and a display unit. The PCU includes logic and components needed for regulating the power state of the cores 202A-202N and the integrated graphics logic 208. The display unit is for driving one or more externally connected displays. The cores 202A-202N can be homogenous or heterogeneous in terms of architecture instruction set. In one embodiment, cores 202A-202N use the same instruction set. Alternatively, two or more of the cores 202A-202N execute the same instruction set, while one or more cores execute a subset of that instruction set or a different instruction set. For example, in one embodiment, the processor 200 contains 4 cores 202A-202D to execute a general purpose instruction set, and also contains core 202E and, optionally, core 202F to execute an instruction set containing graphics specific instructions.

Figure 3:
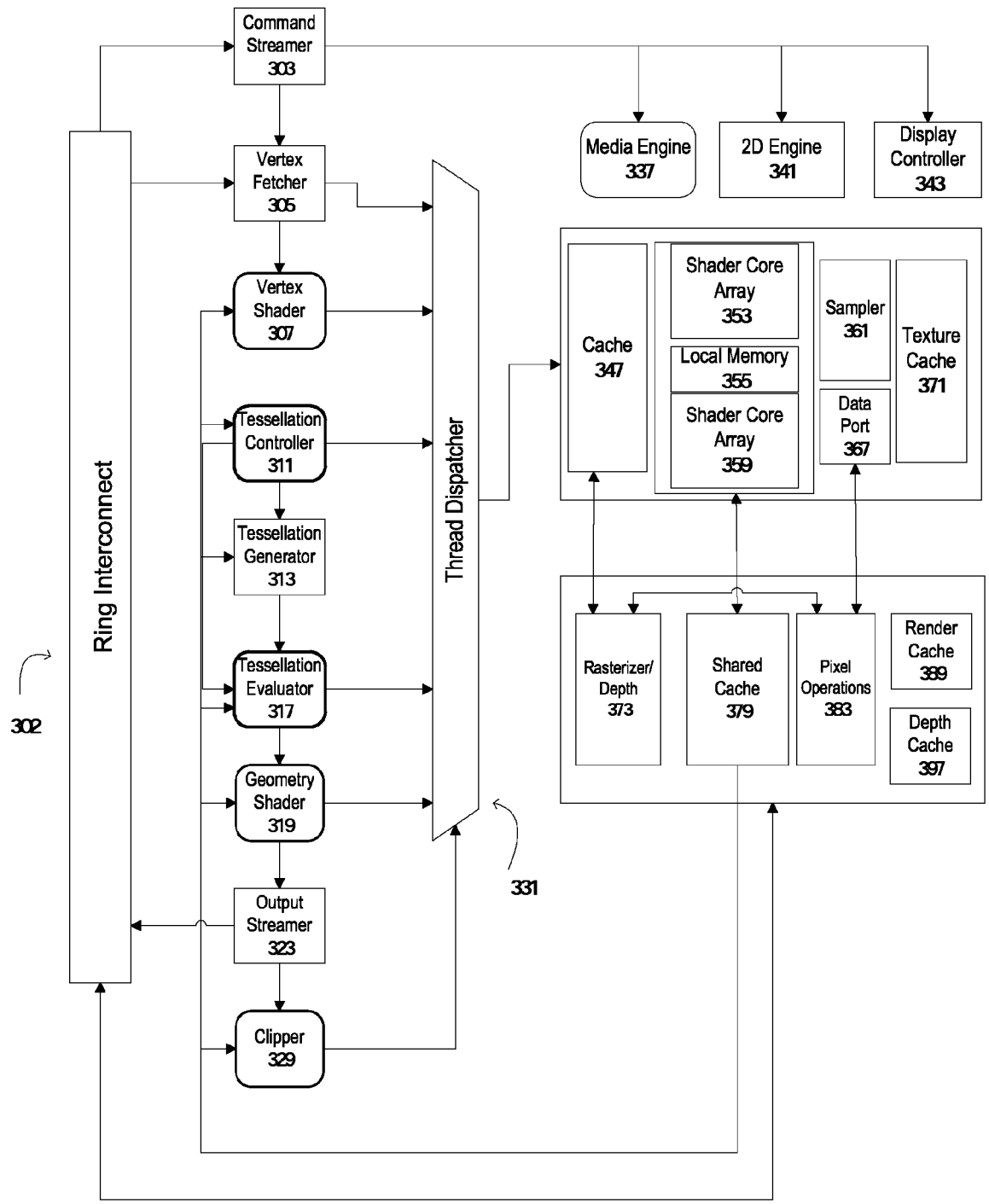
FIG. 3 is a block diagram of one embodiment of a graphics engine.

Embodiments of the invention include implementations of the processor 200 coupled to special purpose logic 208 configured as shown in FIG. 3. In one embodiment, graphics logic as in FIG. 3 contains a ring based interconnect unit 302 coupled to ring based interconnect unit 212. Commands coming from the ring based interconnect are interpreted by a command streamer 303 which supplies instructions to individual components of a 3D graphics pipeline. The command streamer 303 directs the operation of a vertex fetcher 305 component which reads vertex data from memory and executes 3D vertex level commands provided by the command streamer 303. The vertex fetcher 305 provides vertex data to a vertex shader 307 which performs coordinate space transformation and lighting operations to each vertex. The vertex fetcher 305 and vertex shader 307 execute command threads via a thread dispatcher 331 to acquire and process vertex data. Dispatched commands run via one or more shader arrays 353, 359 containing numerous special purpose cores to process commands from a programmable graphics pipeline.

The shader arrays 353, 359 have an attached cache 347 which is specific for each shader array 353, 359 or shared between the arrays. The cache can be configured as a data cache, an instruction cache, or a single cache which is partitioned to contain data and instructions in different partitions. Embodiments of the invention also feature tessellation components in the graphics pipeline to perform hardware accelerated tessellation of 3D objects. A programmable tessellation controller 311 and programmable tessellation evaluator 317 each execute one or more threads in sequence or concurrently on one or more special purpose cores contained within the shader core arrays 353, 349. The tessellation controller is programmed via a shader program referred to as a Hull Shader in the Direct3D API, or a Tessellation Control Shader in the OpenGL API. Different APIs program the tessellation controller differently, but shader programs from each API accept a group of vertices known as a "patch", which is processed to generate a set of tessellation control data and constant data. The control data is used by the tessellation evaluator 317 to interpret the generated vertices, while the tessellation controller 311 sends an output patch and patch constant data to the tessellation generator 313.

The tessellation generator 313 functions at the direction of the tessellation controller 311 and contains special purpose logic to generate a set of finely detailed geometric objects based on the coarse geometric model that is provided as input to the graphics pipeline. A tessellation evaluator 317 post-processes the set of geometric objects generated by the tessellation generator 313 to determine, among other things, the proper positioning coordinates for the vertices in the set of newly generated geometric objects. The tessellation evaluator 317 is configured by a shader program referred to as a tessellation evaluation shader program in the OpenGL API or a domain shader, as is known in the Direct3D API.

The geometric objects are then processed by a geometry shader 319 via one or more threads dispatched to the shader core arrays 353, 359, or can proceed directly to the clipper 329. The geometry shader operates on entire geometric objects, rather than vertices or patches of vertices as in previous stages of the graphics pipeline. If the tessellation units 311, 313, 317 are not enabled, the geometry shader 319 receives input directly from the vertex shader 307. The geometry shader 319 is programmable by a geometry shader program to perform geometry tessellation if the tessellation units are disabled; however the geometry shader lacks the special purpose logic of the tessellation generator and will not perform as efficiently in most cases. If an application is to bypass the rasterizer, and needs access to vertex data, the processed vertex data is written to one or memory buffers via a ring bus interconnect 302 by an output streamer 323. Vertex data destined for the rasterizer is then processed by a clipper 329, which is either a fixed function clipper or a programmable clipper with both clipping and geometry shader functions. After the clipper, vertex data is dispatched over an interconnect bus to the render output pipeline, where a rasterizer 373 dispatches pixel shaders to convert the geometric objects into their per pixel representations. The render output pipeline is discussed in more detail below.

One embodiment of a graphics engine contains a media engine 337, 2D engine 341, and display controller 343 that contains special purpose fixed function logic and operates independently of the 3D pipeline, or alternatively, contains programmable elements that use the shader cores for execution. The display controller 343 is generally connected to a display device (not shown) which may be an integrated display device, as in a laptop computer, or is an external display device attached via an external display device connector such as, for example, a display port or thunderbolt connector.

The graphics engine of FIG. 3 has an interconnect bus to allow data and message passing amongst the major components of the graphics engine. In one embodiment the shader core array 353, 359 and associated caches 347, 371 and texture sampler unit 361 connect to this data bus through a data port 367 to perform memory access and communicate with render output pipeline components of the graphics engine. The render output pipeline contains a rasterizer and depth test component 373 which converts vertex based objects into their associated pixel based representation. An associated render cache 389 and depth cache 397 are also available in some embodiments. A pixel operations component 383 is available to perform pixel based operations on the data, though in some instances, pixel operations associated with 2D operations (e.g. bit block image transfers with blending) are performed by the 2D engine 341, or substituted at display time by the display controller 343 using overlay display planes. In one embodiment a cache 379 is available that is shared amongst all graphics components allowing the sharing of data without the use of main system memory.

Embodiments of the invention are not specific to any one application programming interface, as graphics driver software is used to translate API calls specific to one graphics library to hardware specific commands. One embodiment provides support to the Open Graphics Library supported by the Khronos Group, the Direct3D library from the Microsoft Corporation, or, in one embodiment, both OpenGL and D3D. If tessellation support using these APIs is desired, then at least OpenGL 4.0 or Direct3D 11.0 would be optimal. Future APIs with a compatible 3D pipeline would also be supported if a mapping can be made from the render pipeline of that future API to the pipeline embodied in the graphics hardware.

Tessellation as embodied operates on a group of vertices known as patches that contain a group of vertices that will be tessellated. Patches of vertices will not have an explicit or implied geometric ordering, but provide a framework from which to interpolate vertices during tessellation. The Direct3D domain shader, or OpenGL tessellation evaluation shader, then transforms the generated vertices into a polygonal form. In one embodiment, an OpenGL vertex shader provides an array of vertices, along with attributes corresponding to various output variables. The tessellation control shader will then execute for each vertex and generate two sets of data; control variables that the tessellation evaluator will use to interpret the additional vertices generated by the tessellation generator and tessellation values that the tessellation generator will use to generate new vertices.

In one embodiment, tessellation control is enabled utilizing the Direct3D API. In Direct3D, a shader program named a hull shader controls the tessellation controller 311 to perform the tessellation control functionality that enables the patch to be tessellated by the tessellation generator 313. In the hull shader program, the vertices are processed to define the control points used by the domain shader to position the generated vertices after tessellation. Additionally, the hull shader specifies the tessellation factors that define how the new vertices are generated. The Direct3D API refers to the vertices in the vertex patch as control points. These vertices are the edge points of the control polygon the domain shader uses when positioning the new vertices. In OpenGL, the equivalent of the Direct3D hull shader is the tessellation control shader.

Figure 4:
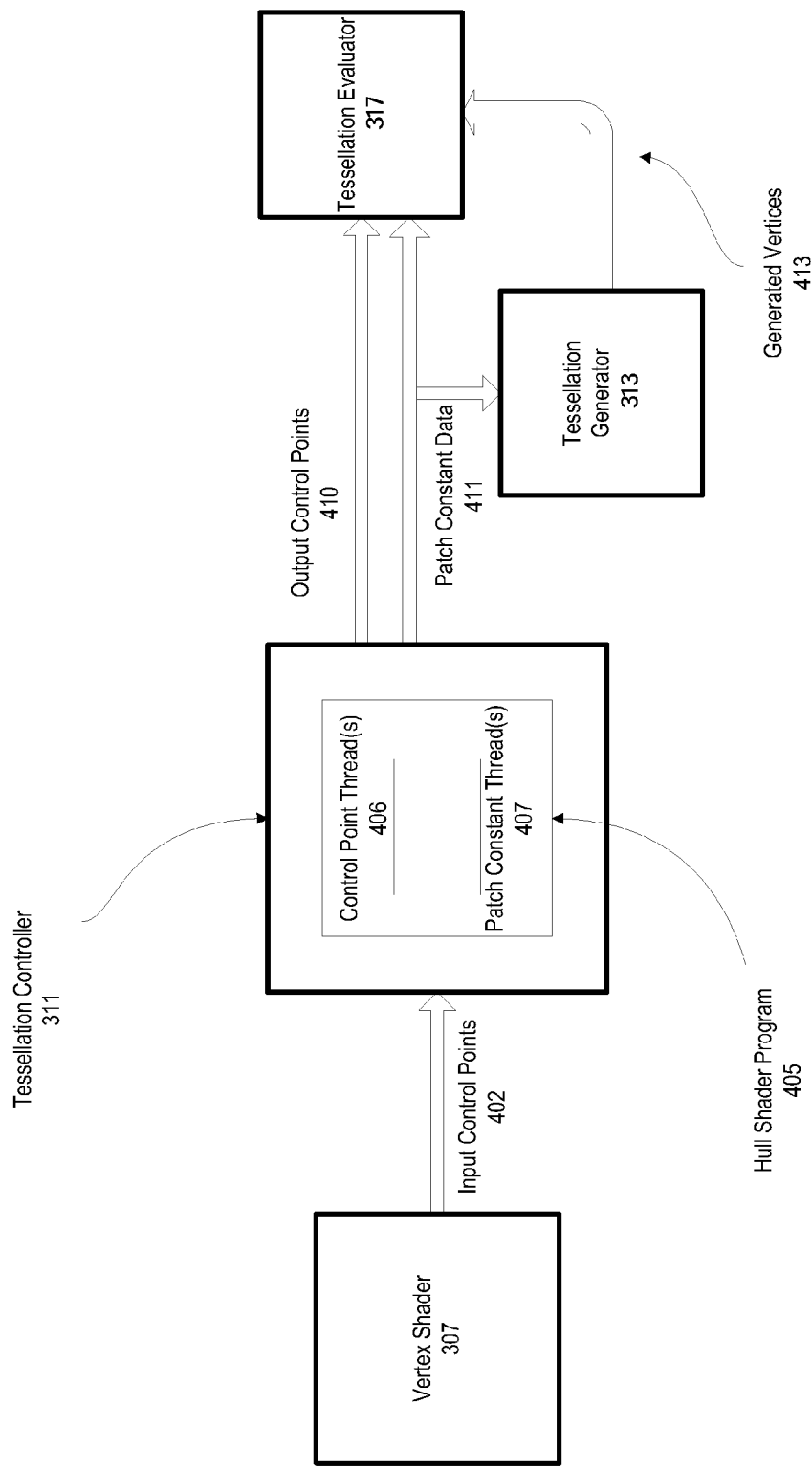
FIG. 4 is a flow diagram of one embodiment of a hull shader program.

FIG. 4 illustrates a flow diagram of a hull shader program as used in Direct3D, though the concepts are also applicable to the OpenGL tessellation control shader. In the Direct3D API, the hull shader is a program that operates the tessellation controller unit, such as the tessellation controller unit 311 of FIG. 3, to process a patch of vertices to determine tessellation factor data and control point data. The tessellation factor data is then used in a tessellation generator (e.g. tessellation generator 313) to determine how many new vertices to interpolate within the vertex patch. The control point data is used by a tessellation evaluator (e.g. tessellation evaluator 317) to place the new vertex data into the 3D scene. For example, the vertex shader 307 performs transform and lighting operations on vertices at the direction of a vertex program. Patches of these vertices then pass into the tessellation controller 311 to be processed by the hull shader program 405. The hull shader 405 generates two phases of threads consisting of control point threads 406 and patch constant threads 407. In one embodiment, the threads of each phase are executed in parallel. The control point phase is executed once for each output control point and transforms the set of input control points 402 into a set containing one or more output control points 410. The patch-constant phase executes once per patch to generates the constant data 411 (e.g. outer and inner tessellation factors) that is used as input to the tessellation generator 313 and tessellation evaluator 317. Though the patch-constant phase only executes once per patch, it is possible to execute multiple instances of the patch-constant logic in parallel during the patch-constant phase.

The tessellation generator 313 generates new vertices by creating new primitives inside of the patch of vertices. In one embodiment, triangles, quads (e.g. rectangles and squares), or lines can be drawn within the vertex patch and then new vertices are generated by subdividing the polygons to make new, smaller polygons. New vertices are then interpolated based on the smaller polygons. For example, a patch containing four vertices can be drawn as a quad primitive, and then subdivided into two triangles. Those two triangles are then subdivided into smaller triangles based on the tessellation factors. Alternately, a quad can be subdivided by a tile of smaller quads. Numerous configurations are possible. The inner tessellation factor controls the number of primitives that are generated within the patch of vertices, and the outer tessellation level controls the number of times to subdivide along the edge of the vertex patch. The vertices generated by the tessellation generator are based on the vertex patch, without regard to the larger set of vertices in the geometric object. The output control points 410 define how the tessellation evaluator 317 transforms the newly generated vertices for use within the 3D scene.

Each control point is referenced with a control point identification number to allow the multiple threads of a shader program to determine which output control point to generate. In one embodiment, the number of patch constant phase threads is runtime managed to limit the number of threads that are dispatched to the graphics engine based on the current state of the graphics hardware, such as the number of available shader cores and number of threads pending dispatch from other shader units. In some instances, all of the shader unit logic from multiple threads is merged into a single execution thread, which will increase the number of free threads available to other shader units at the expense of, in some cases, slightly longer execution time for the single threaded logic in comparison to the multi-threaded logic. Overall graphics pipeline performance is then improved by reducing the amount of contention among shader units in certain high throughput scenarios.

Additionally, it is beneficial to merge operations into a common thread when executing vector operations that exploit data parallelism via Single Instruction Multiple Data (SIMD) operations. SIMD operations can perform a single instruction across multiple vectors of data and allow parallel operations on information without requiring additional execution threads. The ability to limit the number of threads, or to ensure a minimum number of instructions per thread, is desirable because the programmable elements of the graphics pipeline can, in certain high throughput scenarios, attempt to dispatch more hardware execution threads to the shader array than the shader array infrastructure can support, which will slow overall pipeline speed. This is notable in the instance that numerous small threads are dispatched from multiple shader units on the data pipeline and delay the execution of larger, more critical threads. For example, if the tessellation controller dispatches enough threads to the shader array to prevent vertex shader or geometry shader operations from executing timely, then overall pipeline performance is limited.

Figure 5:
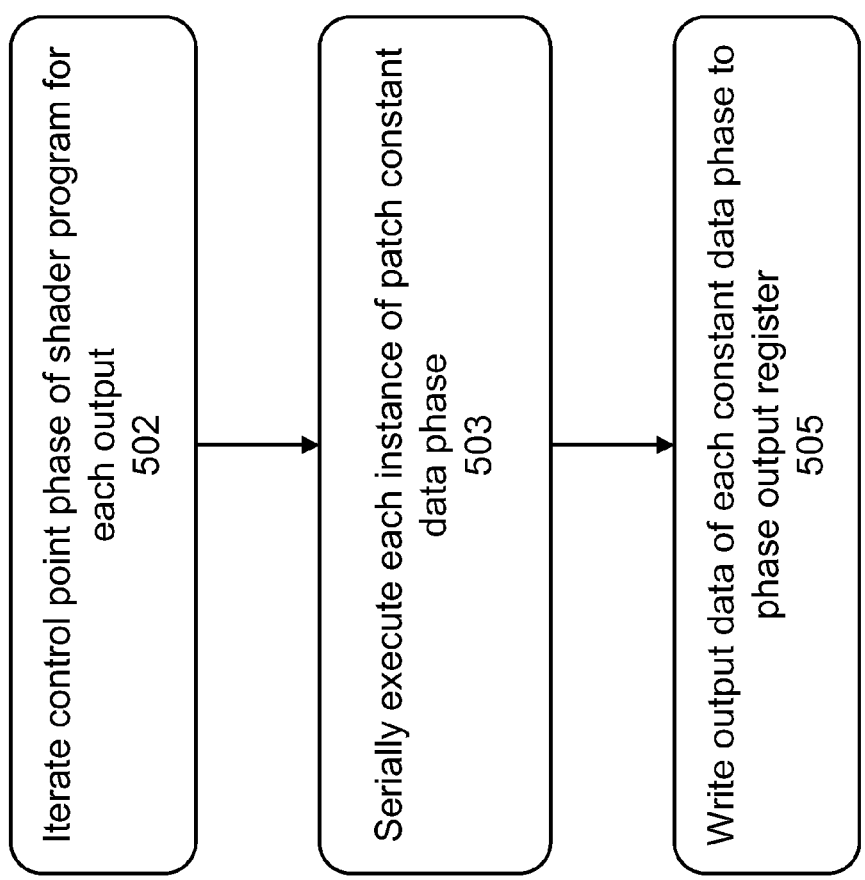
FIG. 5 is a flow diagram of one embodiment of a method of shader serialization and instance unrolling.

FIG. 5 illustrates one embodiment of a method for serializing shader execution and instance unrolling. In one embodiment, this method is quantized into 3 serial operations, though operations on separate phases can be performed in alternative sequences. For example, a tessellation control shader for OpenGL is programmed to calculate per vertex control data and per patch constant data, each in separate execution phases. When it is advantageous to serialize multiple execution threads into a single thread, operation 502 executes each control phase within a single shader execution thread. This is accomplished by configuring loop execution logic to perform a logical iteration of the tessellation control phase for each output point. For example, in the OpenGL API, the graphics engine executes the tessellation control program on a per-vertex basis, and the control phase logic will iterate serially per vertex. In Direct3D, a hull shader program is used, which will program the graphics engine to execute control phase logic per output control point.

Tessellation control shaders that compute per patch tessellation constant data execute in a separate phase of the tessellation control program and can be instanced multiple times. Utilizing operation 503 and operation 505, patch constant data phases that would normally run in separate execution threads execute within a single execution thread. In operation 503, each patch constant data phase contains different logic components for calculating different constants, and each phase is executed serially in a single thread instead. A single patch constant data phase utilizing the same logic can be executed in multiple instances such that the same section of logic is executed multiple times, each directing output to a separate output register on the graphics engine. In such a case, one embodiment, in operation 505, serially executes each instance of the patch constant logic and then directs the output of each of the iterations of that phase to the appropriate output register as specified by the shader control program. In this manner, a shader core capable of efficient SIMD operations can perform parallel execution on multiple groups of data without consuming an additional execution thread, which will free graphics engine thread dispatch logic to dispatch threads for other components of the graphics pipeline, allowing the graphics engine to more effectively manage data flow through the graphics render pipeline.

Figure 6A:
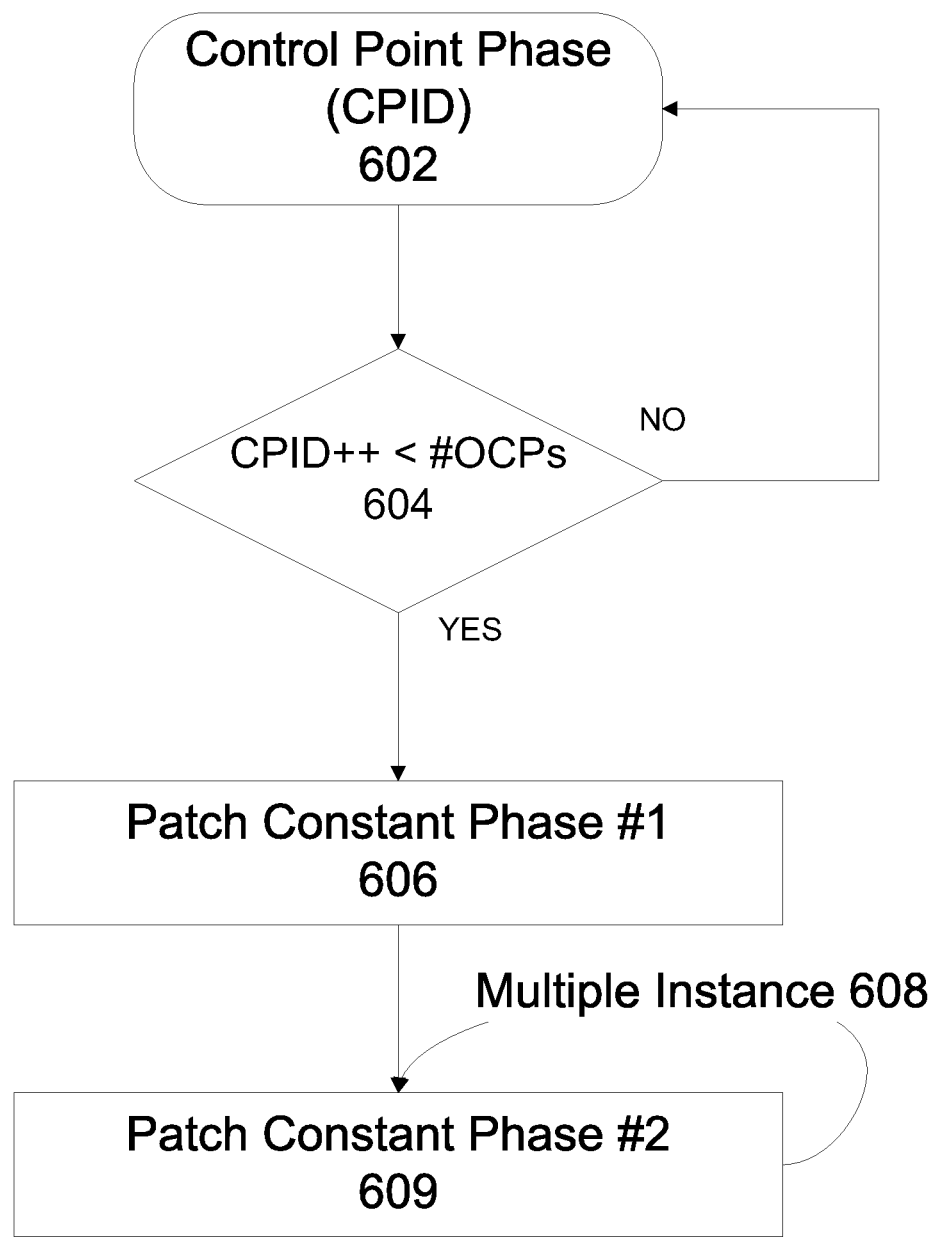
FIG. 6A is a flow chart illustrating one embodiment of a method by which multi-threaded shader logic is serialized into a single graphics engine thread.

FIG. 6A illustrates an embodiment of a method by which multi-threaded shader logic is serialized into a single graphics engine execution thread. In one embodiment, an operation 602 implements one instance of the control point logic on an input Control Point ID (CPID), and operation 604 executes to determine if the output control logic has iterated a sufficient number of times. If not, operation 602 is performed again with a different CPID, followed by an additional operation 604 to check the CPID. Once the control point logic has iterated a sufficient number of times, execution proceeds to a first patch constant phase 606. The first patch constant phase contains multiple sets of calculations to determine a set of per-patch constant values to use as input into the tessellator and tessellation evaluator. For any individual patch constant phase, multiple instances of that phase can be requested by the shader control logic, as shown by parameter 608. In one embodiment, an operation 609 is performed a number of times as indicated by parameter 608.

Figure 6B:
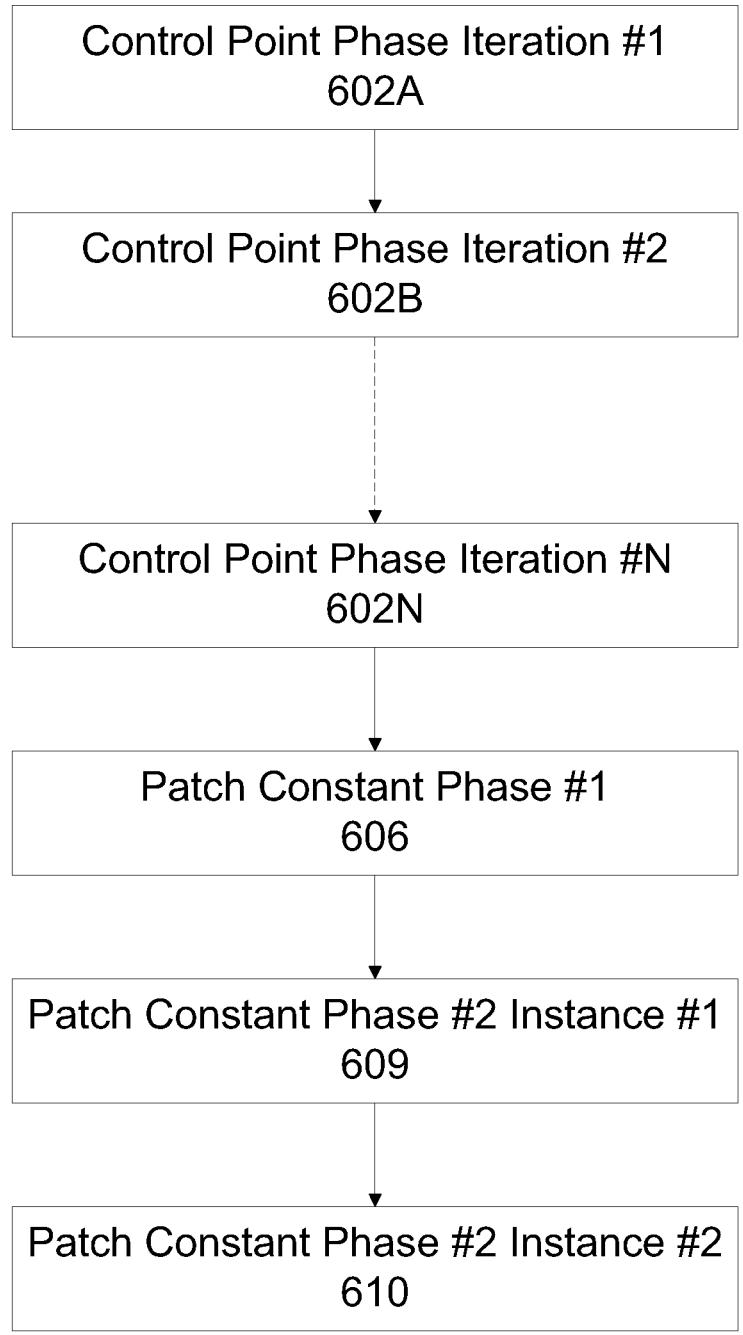
FIG. 6B is a flow chart illustrating the unwound logic flow of an example patch constant phase execution.

FIG. 6B illustrates a flow chart of the unwound logic flow of an example control point phase and patch constant phase execution. In one embodiment, an instance per control point ID of operation 602A-602N is performed for each output control point. After the logic corresponding to first patch constant phase 606 with, in this case, one instance, is executed, a second patch constant phase 609 is unwound and duplicate logic is executed for each requested instance, as illustrated by a second execution of the second patch constant phase 610. Though only 2 instances are illustrated for the patch constant phase, the number of serial iterations is not limited in such a manner.

During the execution of a 3D application utilizing shader code written in a high level language, the high level shader program is converted or assembled into one or more low level shader languages, including shader byte-code, shader assembly, or operation codes for hardware specific instructions. Assembly shader code is used as an example in the tables below; the shader assembly code illustrates the discrete phases and multi-threaded logic of a shader program. While examples of shader merge operations will be illustrated using assembly level shader code, embodiments of the invention are not limited to operating at the assembly level and may operate on other stages of execution.

A shader program for a tessellation controller (e.g. tessellation controller 313 of FIG. 3) consists of a per-control point phase and a per-patch patch constant phase, as illustrated in FIG. 4. Calculations for dynamic level of detail, or other tessellation techniques or optimizations are performed in this phase, however, in some instances no computations are made, and an individual phase will pass-through input data to the appropriate output registers without making modifications. In one embodiment, a pass-through control point phase is replaced with a generic pass-through control point shader. Alternately, the control point shader is completely bypassed and replaced with low level hardware instructions outside of the shader code that copies the memory locations of the input vertex control point data to the memory location assigned to the output control point data.

Partial examples of a tessellation control shader are shown in Tables I-IV below. Table I shows a portion of a hull shader program of Direct3D used to control the tessellation controller 311 of FIG. 3.

TABLE I

Low level hull shader declaration declaring 32 control points.

| | |
|---|---|
| 101 | hs_5_0 |
| 102 | hd_decls |
| 103 | dcl_input_control_point_count 1 |
| 104 | dcl_output_control_point_count 32 |
| 105 | dcl_input vOutputControlPointID |
| 106 | dcl_input i0.xyzw |
| 107 | dcl_input i1.xyzw |
| 108 | dcl_input i2.xy |
| 109 | ... |
| 115 | mov r0.x, vOutputControlPointID |
| 116 | mov o0[r0.x], i0; |
| 117 | mov o1[r0.x], i1; |
| 118 | mov o2[r0.x], i2; |

Table I is an example of a hull shader program that operates on an input patch with a single control point. The input control point has three elements, a position element as i0, a color element, as i1, and a texture coordinate element as i2. Generally, the Direct3D API indicates that a hull shader will execute a shader thread for each output control point, which means, in the case of Table I, thirty-two threads will be executed. A system control point identification number, declared on line 105 as vOutputControlPointID, is used as input to each thread to allow the shader logic to programmatically determine which output control point is to be calculated. In this example, on line 115, the value of vOutputControlPointID is copied into a temporary register, which is then used to index the three elements of each of the thirty-two output control points.

Table II below illustrates how, in one embodiment, the logic of Table I above is executed using a single thread.

TABLE II

Shader operating on 32 output control points in one thread.

| | |
|---|---|
| 201 | hs_5_0 |
| 202 | hd_decls |
| 203 | dcl_input_control_point_count 1 |
| 204 | dcl_output_control_point_count 32 |
| 205 | dcl_input currentOutputControlPointID |
| 206 | dcl_input i0.xyzw |
| 207 | dcl_input i1.xyzw |
| 208 | dcl_input i2.xy |

TABLE II-continued

Shader operating on 32 output control points in one thread.

| | |
|---|---|
| 209 | ... |
| 215 | currentOutputControlPointID= 0; |
| 216 | do { |
| 217 | mov r0.x, currentOutputControlPointID |
| 218 | mov o0[r0.x], i0; |
| 219 | mov o1[r0.x], i1; |
| 220 | mov o2[r0.x], i2; |
| 221 | currentOutputControlPointID = currentOutputControlPointID+ 1; |
| 222 | } while (currentOutputControlPointID < 32) |

In line 203 of Table II above, the same input and output control points illustrated in Table I are used. Additionally, the state information for the 3D API external to the shader is configured to spawn only a single thread for this shader unit. In line 215, currentOutputControlPointID is initialized to zero, and in the example loop instruction block shown in lines 216 through 222, the instructions will loop for each required output control point using currentOutputControlpointID as an index, substituting iterated single-threaded logic in place of multi-threaded logic. On line 217 a register is used as a substitute for the current output control point ID system variable. The register is used as an index into the three elements of each output control point, and the register is then incremented on line 221.

Figure 7A:
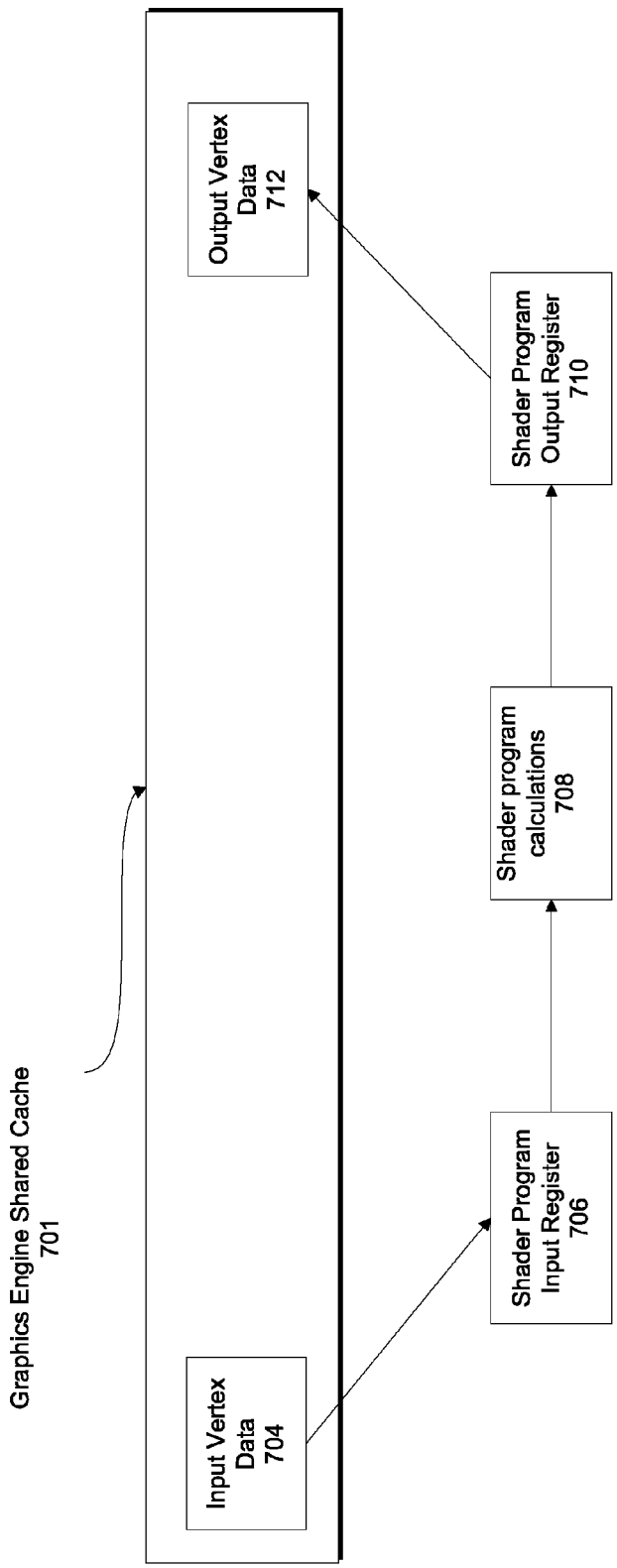
FIG. 7A is an illustration of data flow in one embodiment of a graphics engine during shader unit program execution.

In addition to optimizing low level shader logic, one embodiment of the graphics engine will bypass certain sections of shader code entirely when it is possible replace sections of shader instructions with graphics engine hardware instructions. FIG. 7A shows an illustration of data flow in one embodiment of a graphics engine during shader unit program execution. After the data processed by one shader unit, the output register data is copied to graphics engine shared memory, or, if possible, the graphics engine shared cache. When the output data from one shader unit becomes input data for the next shader unit in the pipeline, data is copied from shared memory or shared cache into the input registers for use by the next shader unit. In one embodiment, output vertex data from the vertex shader is cached to become input vertex data 704 for the tessellation controller. This is loaded into shader program input register 706 where shader program calculations 708 are performed before writing the result data to the shader program output register 710. When the shader program execution is complete, as part of the thread termination process the output registers are copied as output vertex data 712 to a data location in the graphics engine shared cache 701 or, alternatively, the graphics engine local memory.

Figure 7B:
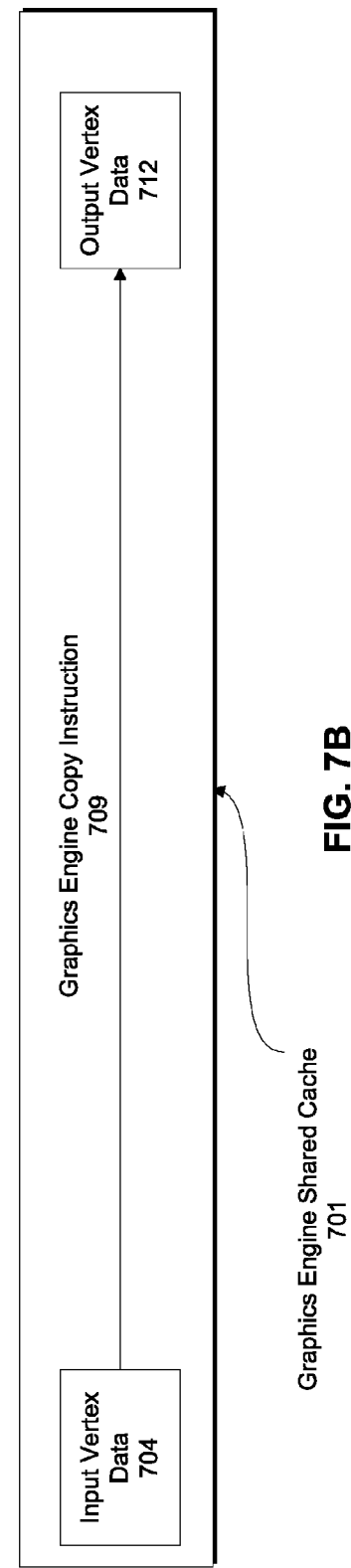

FIG. 7B illustrates the data flow of a graphics engine facilitated data pass-through. In one embodiment, in the instance of a shader phase pass-through, where no shader functions are to be performed, instead of loading the input vertex data 704 into shader register space, the graphics engine copies the input vertex data 704 into the appropriate location in the graphics engine shared cache 701 or graphics engine local memory. The graphics engine, in this case, performs the move operations significantly faster using hardware specific instructions than would be possible when executing shader instructions. In one embodiment, a pointer swap operation is performed instead of a data copy.

In one embodiment, instanced patch constant phase logic that would be otherwise performed in multiple threads is performed within a single execution thread. For example, sample logic of a low level shader that is instanced three times and normally is executed using three threads is illustrated in Table III.

TABLE III

Low level patch constant phase using three threads.

| | |
|---|---|
| 301 | hs__fork__phase |
| 302 | dcl__hs__fork__phase__instance__count 3 |
| 303 | dcl__input vForkInstanceID |
| 304 | dcl__output__siv o0.x, finalTriUeq0EdgeTessFactor |
| 305 | dcl__output__siv o1.x, finalTriVeq0EdgeTessFactor |
| 306 | dcl__output__siv o2.x, finalTriWeq0EdgeTessFactor |
| 307 | dcl__temps 1 |
| 308 | dcl__indexrange o0.x 3 |
| 309 | mov r0.x, vForkInstanceID.x |
| 310 | mov o[r0.x + 0].x, 3.0 |
| 311 | ret |

In Table III, the hs_fork_phase instruction shown on line 301 indicates this section of logic is computed in a separate execution thread from the rest of the shader program. Additionally, line 302 indicates that three separate instances of the logic are executed in three separate threads. Lines 304-306 each indicate the three separate output registers that correspond to the three system variables. Once the calculation of the output data is complete, each thread will write to the corresponding output register based on the logic illustrated on lines 309-310. The vForkInstanceID.x input is modified by the system based on which instance is in execution, and the output results are written in parallel to the output register corresponding to the instance identification number of the thread.

In some instances, however, the overall system performance is improved by executing all of the instructions serially in a single thread instead of multiple parallel threads. In one embodiment, the low level code illustrated in Table III is reconfigured to execute the logic of each instance as a single thread. When the shader cores complete execution of the shader logic, the output data for the multiple instances is directly written to the appropriate instance output register. One example of logic of Table III reconfigured to execute in a single thread instead of multiple parallel threads is illustrated in Table IV below.

TABLE IV

Low level shader using one thread.

| | |
|---|---|
| 401 | hs__fork__phase |
| 402 | dcl__output__siv o0.x, finalTriUeq0EdgeTessFactor |
| 403 | dcl__output__siv o1.x, finalTriVeq0EdgeTessFactor |
| 404 | dcl__output__siv o2.x, finalTriWeq0EdgeTessFactor |
| 405 | mov o0.x, 3.0 |
| 406 | mov o1.x, 3.0 |
| 407 | mov o2.x, 3.0 |
| 408 | ret |

As illustrated in Table IV, the instancing logic is bypassed and each operation executes serially. The output registers are then directly loaded with the appropriate values, as illustrated in lines 405-407. The overall system efficiency is enhanced by executing the logic of Table IV as opposed to the logic of Table III. The same functionality is performed while allowing two threads from other shader units to execute in the place of the two tessellation control shaders threads that have been eliminated. Any additional execution time required for the single threaded logic is hidden by increased overall pipeline performance.

Figure 8:
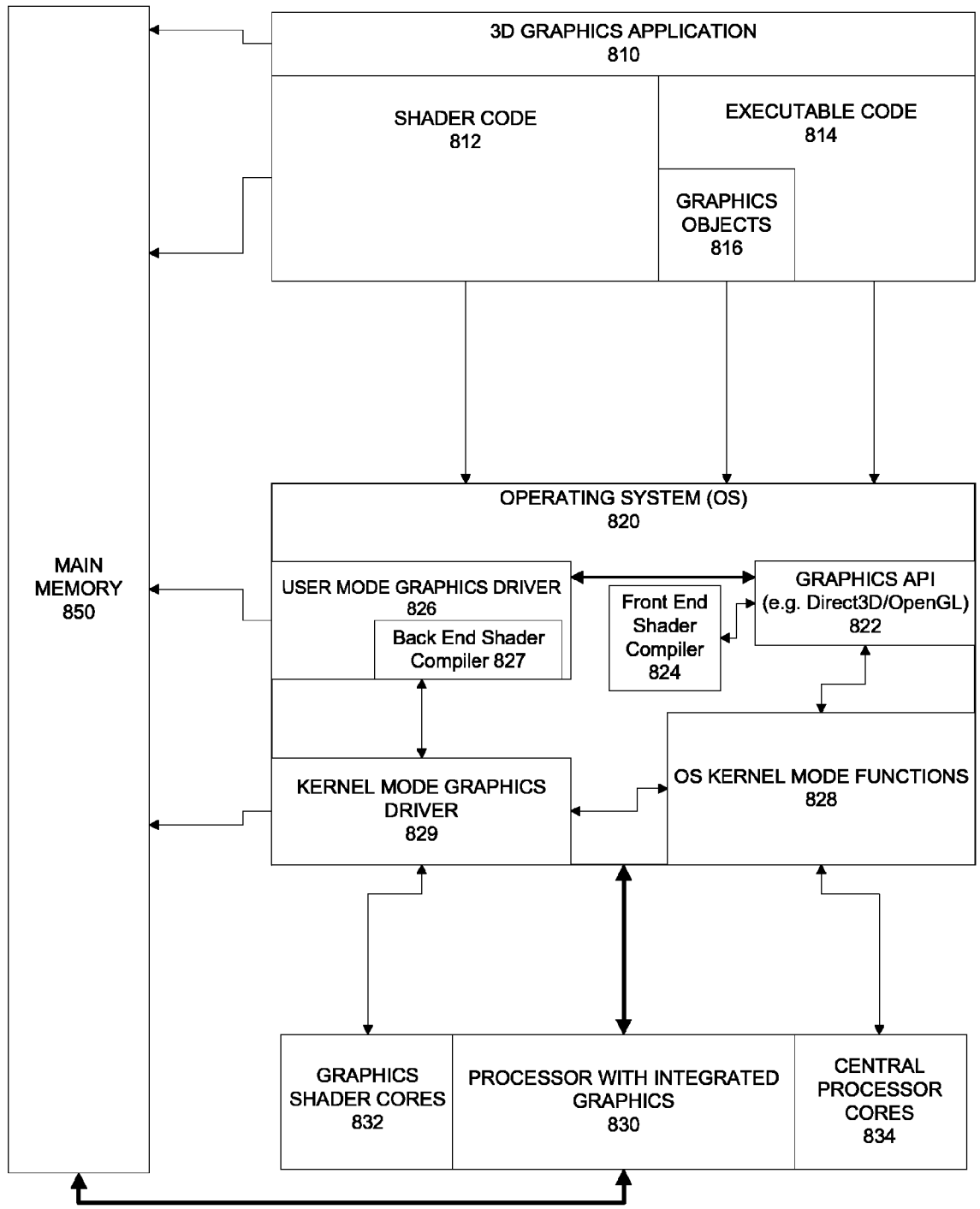
FIG. 8 is a block diagram of one embodiment of a data processing system, which can perform load balancing, and merging of shader execution thread workloads.

FIG. 8 illustrates an example of a data processing system which includes embodiments of the invention. In one embodiment, a 3D graphics application 810 runs in main system memory 850 and contains shader code 812 written in a high level shader language, and processor executable code for execution on the central processor cores 834. The 3D graphics application also includes graphics objects 816 defined by vertex data. An operating system 820 includes a graphics Application Programming Interface (API) 822, such as Direct3D or OpenGL which provides an interface for the 3D graphics application.

In one embodiment, the operating system 820 is a Microsoft Windows operating system from the Microsoft Corporation or, alternately, is a UNIX based operating system. When utilizing the Direct3D API, the operating system 820 contains a front end shader compiler 824 to convert shaders written in a high level shader language to shaders represented by a low level shader language. In one embodiment, however, the OpenGL API is enabled, which passes the high level shader directly to the user mode graphics driver 826 which is capable of performing high level shader compilation. The user mode graphics driver 826 contains a back end shader compiler 827 to convert the shader code into a hardware specific representation. In one embodiment, the methods discussed above are implemented in the user mode graphics driver 826, or back end shader compiler 827 as appropriate under the circumstances, depending on the capability or configuration of the graphics engine. Embodiments of the processor with integrated graphics 830 can also perform the thread management logic within the graphics pipeline hardware or microcode.

The user mode graphics driver uses OS kernel mode functions 828 to communicate with a kernel mode graphics driver 829, and the kernel mode graphics driver 829 communicates with a processor which, in one embodiment, is a processor with integrated graphics 830 containing general purpose processor cores 834 and graphics specific shader execution cores 832. In the alternative, a discrete, non-integrated graphics core attached to the processor via a bus is also possible. In one embodiment, all or part of the threading enhancement logic is implemented in one or more of the graphics specific shader cores 832, or within the thread dispatch logic 331 of the graphics engine 830, as illustrated in FIG. 3.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface. A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A machine implemented method comprising:
executing a shader program comprising instructions merged from multiple graphics engine execution threads, wherein executing the instructions from the multiple graphics engine execution threads comprises:
executing an iteration of a first phase of a multi-phase shader program;
executing an instance of a second phase; and
writing an output value to an output register corresponding to the instance of the second phase.

2. The method of claim 1 wherein executing the first phase of the multi-phase shader program computes output control points for a graphics engine tessellator.

3. The method of claim 2 wherein input control point data is copied to an output control point using a hardware level copy instruction.

4. The method of claim 2 wherein executing an iteration of the first phase of the multi-phase shader program comprises iterating for each output control point.

5. The method of claim 1 wherein the second phase of the multi-phase shader program computes data constants for a graphics engine tessellator.

6. The method of claim 5 wherein the shader program specifies more than one instance of the second phase, each instance having an instance identification number and an output register.

7. The method of claim 6 wherein each additional instance of the second phase specified by the shader program is executed and the output value is written to the register specified by the shader program.

8. An article of manufacture comprising:
a non-transitory machine-storage medium including data that, when accessed by a machine, cause the machine to perform operations comprising:
merging instructions from a multi-threaded shader program into a multi-phase shader program;
iterating a first phase of the multi-phase shader program; and
executing, after the first phase, each remaining phase of the multi-phase shader program, wherein the remaining phases have one or more instances of each phase, each instance having an instance identification number and a corresponding output register, and executing each remaining phase comprises serially executing each instance of each remaining phase, and writing, for each instance of each remaining phase, an output value of each instance to the output register corresponding to the instance identification number of each of the one or more instances of each remaining phase.

9. The article of manufacture of claim 8 wherein the first phase of the multi-phase shader program is iterated for each output of the first phase.

10. The article of manufacture of claim 9 wherein the first phase of the mufti-phase shader program computes control points for a graphics engine tessellator.

11. The article of manufacture of claim 8 wherein a second phase of the multi-phase shader program computes data constants for a graphics engine tessellator.

12. The article of manufacture of claim 11 wherein input control points are copied to output control points using hardware level copy instructions.

13. A processor comprising:
an integrated graphics engine, to execute instructions merged from a multi-threaded shader program using a reduced number of graphics engine execution threads, the integrated graphics engine comprising:
a tessellation primitive generator, to generate a set of high detail geometric objects from a set of low detail geometric objects; and
a tessellation controller, to configure the tessellation primitive generator, comprising logic that computes one or more output control points for the tessellation primitive generator, and computes constant data for a patch of vertices in a geometric object.

14. The processor of claim 13 wherein the tessellation controller copies an input control point to an output control point using a hardware level copy instruction.

15. The processor of claim 13 wherein the reduced number of graphics execution threads includes a single execution thread, and the tessellation controller further to execute multiple threads of output control point logic in the single execution thread by iterating control point instructions for each output control point.

16. The processor of claim 15 wherein the tessellation controller further to execute multiple threads of patch constant data computation phases in the single execution thread by serially executing each instance of each computation phase and storing output of each phase in the each output register corresponding to the instance of each phase.

17. A system comprising:
one or more processors having multiple processing cores;
a main system memory coupled to the one or more processors, to store graphics shader code;
a graphics engine coupled to the one or more processors and the main system memory, to execute instructions merged from a multi-threaded shader program, the instructions executed using a reduced number of graphics engine execution threads; and
a display device, to display output from the graphics engine.

18. The system of claim 17 wherein the graphics engine further comprises:
a tessellation primitive generator, to generate a set of high detail geometric objects from a set of low detail geometric objects; and
a tessellation controller, to configure the tessellation primitive generator, comprising logic that computes one or more output control points for the tessellation primitive generator, and computes constant data for a patch of vertices in a geometric object.

19. The system of claim 18 wherein the reduced number of graphics execution threads includes a single execution thread, and the tessellation controller further to execute multiple threads of output control point logic in the single execution thread by iterating control point instructions for each output control point, and copies unmodified input control points to output control point using a hardware level copy instruction.

20. The system of claim 19 wherein the tessellation controller further to execute multiple threads of patch constant data computation phases in the single execution thread by serially executing each instance of each computation phase and storing output of each phase in the each output register corresponding to the instance of each phase.

* * * * *